April 14, 1936. J. D. LALOR 2,037,663
FLOW CONTROLLING DEVICE
Filed Jan. 7, 1932
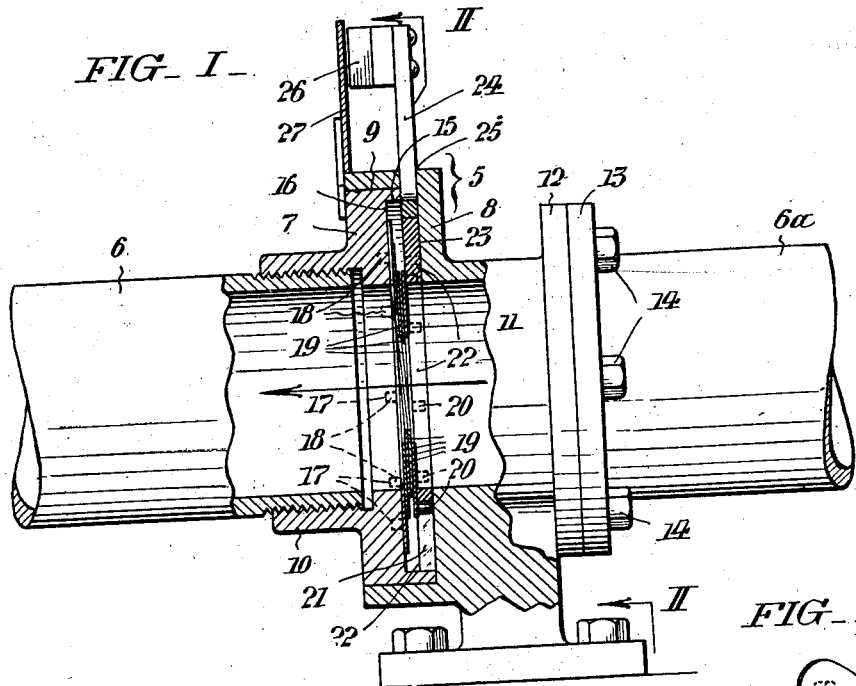
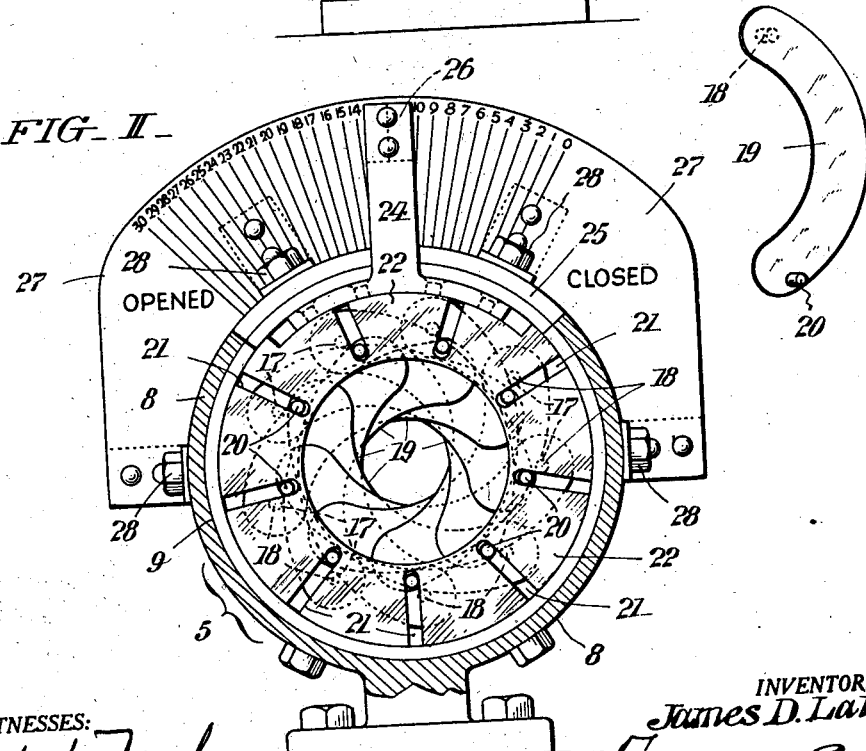
INVENTOR:
James D. Lalor,
BY
ATTORNEYS.
WITNESSES:

Patented Apr. 14, 1936

2,037,663

UNITED STATES PATENT OFFICE 2,037,663

FLOW CONTROLLING DEVICE

James D. Lalor, Baltimore, Md.; Marjorie Lalor administratrix of said James D. Lalor, deceased Application January 7, 1932, Serial No. 585,214

1 Claim. (Cl. 251—18)

This invention relates to devices for controlling the flow of gases in conduits or mains; and it has more particular reference to a control designed for use in oil burning apparatus to govern the amount of combustion supporting air supplied to the burners.

For the perfect combustion of low Baumé test oils customarily employed in apparatus of the kind referred to, it is requisite that a uniform supply of air at a constant pressure be accurately maintained for mixture with the discharge of atomized oil released by the burners. This ideal is impossible of realization with the gate or butterfly valves ordinarily used heretofore in oil burning apparatus, by reason of the difficulty of adjusting such valves with accuracy, as well as due to changes in the shape of the valve orifices incident to adjustment, and to variant disalignment of the orifices relative to the axes of the air conducting conduits or mains; the latter condition causing unsteadiness in the flow, fluctuations in the supply of air at the burners, and flickering of the flame.

Considered from the broadest aspect, my invention is directed toward overcoming the drawbacks just pointed out. This desideratum I attain, as hereinafter fully set forth, through provision of a device embodying a segmental diaphragm, and means whereby the diaphragm segments may be simultaneously adjusted to vary the size of a circular flow opening which is always in coaxial relation to the conduit or main in which the device is interposed.

A further object of my invention is to afford in connection with a device having the recited characteristics, a simple and direct reading gage means whereby the diaphragm may be set with absolute precision to maintain any predetermined flow of air in the conduit or main.

Other objects and attendant advantages of this invention will be manifest from the detailed description following in connection with the attached drawing, wherein Fig. I is a fragmentary view, partly in side elevation and partly in axial section, of an air conduit fitted with a flow control embodying the present improvements.

Fig. II is a transverse sectional view taken as indicated by the arrows II—II in Fig. I; and, Fig. III is a perspective view of one of the segments of the control diaphragm.

As herein illustrated, my improved device comprises a circular casing 5 which is axially interposed between the sections 6, 6a of a conduit through which air or other gas is being conducted in the direction indicated by the arrow shown in Fig. I. The casing 5 is made in two parts respectively designated by the numerals 7 and 8, the part 7 fitting into the circular hollow 9 of the part 8 and being formed with an axial boss 10 which is internally threaded to receive the correspondingly threaded end of the section 6 of the conduit. The casing component 8 is, on the other hand, formed with a coaxial neck extension 11 which is flanged as at 12 for abutment of a flange 13 on the other section 6a of the conduit, the flanges being united by bolts 14. The casing component 7 is axially recessed as at 15 with provision of a transverse annular face 16, the said face having a circular series of openings 17 concentrically arranged with respect to the axis of the casing 5. As shown, the openings 17 receive fulcrum studs 18 projecting laterally from the outer ends of a series of diaphragm segments 19 which are fashioned to arcuate configuration from sheet metal and which partially overlap each other after the manner shown in Fig. II. Oppositely projecting lateral studs 20 at the inner or swinging ends of the diaphragm segments 19 engage the radial slots 21 of a ring 22 which is confined to rotation within the recess 15 of the casing component 7 and which bears against the inner face 23 of the cavity 9 in the casing component 8. As shown in Fig. II, an actuating projection or finger grasp 24 extends radially outward from the ring 22 through a slot 25 in the annular wall of the casing component 8, the said handle being provided with a pointer 26 for coordination with numbered graduations on a scale or gage 27 suitably secured to the casing by means of screw bolts 28.

To set the device, the ring 22 is turned by means of the actuating projection 24, either to the right or the left, in accordance with the indications on the scale or gage 27, depending on whether the valve is to be opened or closed. As a consequence the curved segments 19 of the diaphragm are moved either outward or inward relative to the axis of the conduit with attendant variation in the size of the central orifice through the diaphragm. Since the diaphragm orifice is always circular and always central throughout the range of adjustment from closed to full open position of the device it is evident that a uniform flow may be accurately maintained through the conduit, the volume or rate of flow being of course dependent upon the setting of the device in accordance with the graduations of the gage 27. My improved control device is thus highly advantageous in instances where a steady supply of air or other gas is prerequisite as in oil burning equipment.

Having thus described my invention, I claim:

A device for controlling fluid flow in a conduit, comprising coupling parts having means for attaching them to adjacent sections of the conduit and also having abutting faces with annular shoulders directly interengaged one around the other for maintaining the conduit sections in axial alignment, said parts having in and between them an annular recess, with fluid-tight sides, around the flow passage through them; a series of arcuate laterally overlapping diaphragm leaves housed and fulcrumed in said recess; an annular actuator in and substantially filling said recess, at its inner edge, beside said leaves, pivotally connected to them and annularly engaged with one of said members for turning movement in the recess; and operating means for said actuator operatively connected with it on its peripheral edge, leaving the sides of said recess uninterrupted and entirely closed.

JAMES D. LALOR.